(12) United States Patent
Sun et al.

(10) Patent No.: US 11,444,477 B2
(45) Date of Patent: Sep. 13, 2022

(54) CONSTANT POWER CHARGING METHOD AND DEVICE FOR MOBILE TERMINAL

(71) Applicant: Beijing Xiaomi Mobile Software Co., Ltd., Beijing (CN)

(72) Inventors: Changyu Sun, Beijing (CN); Yanteng Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 147 days.

(21) Appl. No.: 16/698,032

(22) Filed: Nov. 27, 2019

(65) Prior Publication Data

US 2021/0066941 A1   Mar. 4, 2021

(30) Foreign Application Priority Data

Aug. 30, 2019   (CN) .......................... 201910814859.9

(51) Int. Cl.
*H02J 7/00*   (2006.01)
*H02J 7/04*   (2006.01)
(Continued)

(52) U.S. Cl.
CPC .............. *H02J 7/0071* (2020.01); *H02J 1/04* (2013.01); *H02J 7/007* (2013.01); *H01M 10/44* (2013.01);
(Continued)

(58) Field of Classification Search
CPC ............. H02J 7/0071; H02J 7/007; H02J 1/04
(Continued)

(56) References Cited

U.S. PATENT DOCUMENTS 5,382,893 A * 1/1995 Dehnel ................... H02J 9/061
                                                               320/160
5,696,436 A * 12/1997 Kim ..................... H02J 7/00712
                                                               320/160
(Continued)

FOREIGN PATENT DOCUMENTS

CA          3057765 C    * 12/2020   ............ H02M 3/158
CN        103138021 A       6/2013
(Continued)

OTHER PUBLICATIONS

English version of International Search Report in International Application No. PCT/CN2019/110667, dated Apr. 30, 2020.
(Continued)

*Primary Examiner* — John T Trischler
(74) *Attorney, Agent, or Firm* — Finnegan, Henderson, Farabow, Garrett & Dunner, L.L.P.

(57) ABSTRACT

A charging method for a mobile terminal includes charging a rechargeable battery of the mobile terminal with a constant power, which further includes: charging the rechargeable battery of the mobile terminal with a first constant power determined based on an average charging power supported by the mobile terminal, when a maximum output power of a charger is greater than or equal to the average charging power supported by the mobile terminal; and charging the rechargeable battery of the mobile terminal with a second constant power determined based on the maximum output power of the charger, when the maximum output power of the charger is less than the average charging power supported by the mobile terminal.

11 Claims, 8 Drawing Sheets

(51) Int. Cl.
*H02J 1/04* (2006.01)
*H01M 10/44* (2006.01)

(52) U.S. Cl.
CPC ....... *H02J 7/00032* (2020.01); *H02J 7/00034* (2020.01); *H02J 7/00712* (2020.01)

(58) Field of Classification Search
USPC .......................................................... 320/107
See application file for complete search history.

(56) References Cited

U.S. PATENT DOCUMENTS

| | | | | |
|---|---|---|---|---|
| 5,994,878 | A * | 11/1999 | Ostergaard | H02J 7/0031 320/132 |
| 5,998,972 | A * | 12/1999 | Gong | H02J 7/0077 320/164 |
| 6,664,765 | B2 * | 12/2003 | Dotzler | H02J 7/0071 320/162 |
| 7,129,675 | B2 * | 10/2006 | Brecht | H02J 7/007184 320/137 |
| 7,176,654 | B2 * | 2/2007 | Meyer | H02J 7/045 320/110 |
| 7,262,580 | B2 * | 8/2007 | Meyer | H02J 7/0036 320/141 |
| 7,321,219 | B2 * | 1/2008 | Meyer | H02J 7/0031 320/125 |
| 7,323,847 | B2 * | 1/2008 | Meyer | H02J 7/0042 320/110 |
| 7,411,371 | B2 * | 8/2008 | Hobbs | B60L 3/0046 320/128 |
| 7,508,167 | B2 * | 3/2009 | Meyer | H02J 7/0013 320/135 |
| 7,622,898 | B2 * | 11/2009 | Shimizu | H02J 7/0016 320/166 |
| 7,743,649 | B1 * | 6/2010 | Salman | F02N 11/0859 73/114.59 |
| 7,977,921 | B2 * | 7/2011 | Bahai | H02J 7/022 320/140 |
| 8,018,198 | B2 * | 9/2011 | Meyer | H02J 7/0036 320/136 |
| 8,222,870 | B2 * | 7/2012 | Guo | H01M 10/482 320/145 |
| 8,237,412 | B2 * | 8/2012 | Johnson | H02J 5/00 320/140 |
| 8,479,024 | B2 * | 7/2013 | Vichare | G06Q 50/06 713/340 |
| 8,525,479 | B2 * | 9/2013 | Meyer | H02J 7/045 320/135 |
| 8,729,868 | B2 * | 5/2014 | Odaohhara | H02J 7/0068 320/164 |
| 8,880,264 | B2 * | 11/2014 | Saito | H01M 10/44 701/22 |
| 9,118,189 | B2 * | 8/2015 | Meyer | H02J 7/00711 |
| 9,188,649 | B2 * | 11/2015 | Chen | G01R 31/389 |
| 9,368,995 | B2 * | 6/2016 | Nishino | H01M 10/46 |
| 9,404,976 | B2 * | 8/2016 | Michinaga | H01M 10/441 |
| 9,525,300 | B2 * | 12/2016 | Aridome | B60L 53/14 |
| 9,595,843 | B2 * | 3/2017 | Kim | H02J 7/007 |
| 10,008,864 | B2 * | 6/2018 | Meyer | H02J 7/00302 |
| 10,038,326 | B2 * | 7/2018 | Chen | H02J 7/0021 |
| 10,065,518 | B2 * | 9/2018 | Steele | H02J 7/007 |
| 10,374,443 | B2 * | 8/2019 | Meyer | H02J 7/0042 |
| 10,447,054 | B2 * | 10/2019 | Christensen | G01R 31/367 |
| 10,534,420 | B2 * | 1/2020 | Yu | G06F 1/324 |
| 10,714,948 | B2 * | 7/2020 | Meyer | H02J 7/00047 |
| 10,749,383 | B2 * | 8/2020 | Kobayashi | H02J 50/12 |
| 10,875,418 | B2 * | 12/2020 | Ishida | B60L 53/24 |
| 10,958,088 | B2 * | 3/2021 | Kwak | H02J 7/0036 |
| 11,056,901 | B2 * | 7/2021 | Song | H01M 10/44 |
| 11,063,446 | B2 * | 7/2021 | Meyer | H02J 7/0013 |
| 2002/0000788 | A1 * | 1/2002 | Ostergaard | H02J 7/00047 320/128 |
| 2003/0141850 | A1 * | 7/2003 | Dotzler | H02J 7/0071 320/137 |
| 2004/0155631 | A1 * | 8/2004 | Ishizu | H02J 7/0044 320/166 |
| 2004/0263119 | A1 * | 12/2004 | Meyer | H02J 7/00036 320/116 |
| 2005/0017684 | A1 * | 1/2005 | Brecht | H02J 7/007184 320/131 |
| 2005/0212482 | A1 * | 9/2005 | Nakada | H02J 7/0016 320/120 |
| 2006/0028178 | A1 * | 2/2006 | Hobbs | B60L 8/006 320/128 |
| 2006/0108975 | A1 * | 5/2006 | Meyer | H02J 7/04 320/107 |
| 2006/0108983 | A1 * | 5/2006 | Meyer | H02J 7/0019 320/128 |
| 2007/0103109 | A1 * | 5/2007 | Meyer | H02J 7/0091 320/103 |
| 2007/0108943 | A1 * | 5/2007 | Kobayashi | H02J 7/35 320/128 |
| 2007/0194759 | A1 * | 8/2007 | Shimizu | H02J 7/345 320/166 |
| 2007/0236173 | A1 * | 10/2007 | Kimura | H01M 10/42 320/112 |
| 2007/0273334 | A1 * | 11/2007 | Meyer | H02J 7/00302 320/145 |
| 2008/0218130 | A1 * | 9/2008 | Guo | H01M 10/441 320/162 |
| 2009/0027013 | A1 * | 1/2009 | Odaohhara | H02J 7/0068 320/160 |
| 2009/0153101 | A1 * | 6/2009 | Meyer | H02J 7/007194 320/119 |
| 2010/0039840 | A1 * | 2/2010 | Bahai | H02J 7/02 363/65 |
| 2010/0154524 | A1 * | 6/2010 | Salman | F02N 11/0862 73/114.59 |
| 2011/0007491 | A1 * | 1/2011 | Robinson | H02J 7/0068 361/810 |
| 2011/0050163 | A1 * | 3/2011 | Xiao | H02J 7/0072 320/107 |
| 2012/0001596 | A1 * | 1/2012 | Meyer | H02J 7/0042 320/125 |
| 2012/0109555 | A1 * | 5/2012 | Humphrey | H01M 10/4207 324/426 |
| 2012/0249022 | A1 * | 10/2012 | Washburn | B60K 1/02 180/65.21 |
| 2012/0293112 | A1 * | 11/2012 | Suzuki | H02J 7/0019 320/107 |
| 2013/0038297 | A1 * | 2/2013 | Sang | H02J 7/0071 320/145 |
| 2013/0103332 | A1 * | 4/2013 | Chen | G01R 31/396 702/63 |
| 2013/0134947 | A1 * | 5/2013 | Wang | G06F 1/305 320/137 |
| 2013/0197710 | A1 * | 8/2013 | Hansen | H02J 3/144 700/297 |
| 2013/0231818 | A1 * | 9/2013 | Saito | B60L 53/64 701/22 |
| 2013/0241471 | A1 * | 9/2013 | Arai | H02J 7/0016 320/107 |
| 2013/0335012 | A1 * | 12/2013 | Meyer | H02J 7/0069 320/107 |
| 2014/0375279 | A1 * | 12/2014 | Nishino | H01M 10/44 320/160 |
| 2015/0054456 | A1 * | 2/2015 | Yamakawa | B60L 53/126 320/108 |
| 2015/0236525 | A1 * | 8/2015 | Aridome | B60L 58/22 320/107 |
| 2015/0340887 | A1 * | 11/2015 | Meyer | H02J 7/0042 320/112 |
| 2016/0380444 | A1 * | 12/2016 | Al Shakarchi | H02J 3/382 320/107 |
| 2017/0093180 | A1 * | 3/2017 | Wang | H02J 7/00712 |
| 2017/0244261 | A1 | 8/2017 | Chen | |
| 2017/0334304 | A1 * | 11/2017 | Steele | B60L 53/60 |
| 2017/0338666 | A1 * | 11/2017 | Christensen | H01M 10/441 |

(56) References Cited

U.S. PATENT DOCUMENTS

| | | | |
|---|---|---|---|
| 2018/0034289 A1* | 2/2018 | Meyer | H02J 7/0091 |
| 2018/0062514 A1* | 3/2018 | Dong | H02J 7/34 |
| 2018/0096405 A1* | 4/2018 | Cho | G06Q 20/20 |
| 2018/0181182 A1* | 6/2018 | Yu | G06F 1/3212 |
| 2018/0205253 A1* | 7/2018 | Kwak | H02J 7/0036 |
| 2018/0222331 A1* | 8/2018 | Erdem | B60L 53/64 |
| 2018/0226695 A1* | 8/2018 | Miyaki | H01M 4/525 |
| 2018/0309304 A1* | 10/2018 | Meyer | H02J 7/0045 |
| 2019/0013700 A1* | 1/2019 | Kobayashi | H02J 50/40 |
| 2019/0044336 A1* | 2/2019 | Wagner | H02J 3/32 |
| 2019/0291600 A1* | 9/2019 | Takemoto | B60L 58/15 |
| 2019/0356142 A1* | 11/2019 | Meyer | H02J 7/007182 |
| 2020/0009980 A1* | 1/2020 | Ishida | B60L 53/62 |
| 2020/0343740 A1* | 10/2020 | Meyer | H02J 7/0031 |
| 2020/0373779 A1* | 11/2020 | Arizono | H01M 10/48 |
| 2021/0078431 A1* | 3/2021 | Nagatochi | H02J 7/007194 |
| 2021/0184475 A1* | 6/2021 | Sun | H02J 7/0013 |
| 2021/0265674 A1* | 8/2021 | Doczy | G01R 31/389 |
| 2021/0336450 A1* | 10/2021 | Meyer | H02J 7/0042 |

FOREIGN PATENT DOCUMENTS

| | | | | |
|---|---|---|---|---|
| CN | 102904309 B | | 7/2015 | |
| CN | 105186663 A | | 12/2015 | |
| CN | 105914831 A | | 8/2016 | |
| CN | 205565772 U | | 9/2016 | |
| CN | 106058990 A | | 10/2016 | |
| CN | 107069120 A | | 8/2017 | |
| CN | 108110349 A | | 6/2018 | |
| CN | 108321915 A | * | 7/2018 | |
| CN | 109861331 A | * | 6/2019 | |
| CN | 111934395 A | * | 11/2020 | |
| CN | 213937519 U | * | 8/2021 | |
| EP | 3 151 330 A1 | | 4/2017 | |
| JP | 08106921 A | * | 4/1996 | |
| JP | 8-163786 A | | 6/1996 | |
| JP | 2010200530 A | | 9/2010 | |
| JP | 2013099060 A | | 5/2013 | |
| JP | 2015220956 A | | 12/2015 | |
| KR | 20000002336 A | | 1/2000 | |
| KR | 20180052021 A | | 5/2018 | |
| SU | 1095307 A1 | | 10/1982 | |
| WO | WO-2014167914 A1 | * | 10/2014 | H01M 10/443 |
| WO | WO 2017/141641 A1 | | 8/2017 | |
| WO | WO-2020044932 A1 | * | 3/2020 | H02J 7/00 |

OTHER PUBLICATIONS

International Search Report for International Application No. PCT/CN2019/110667, dated Apr. 30, 2020.

Office Action of Russian Application No. 2019141264/07, dated Jul. 30, 2020.

Extended European Search Report for European Application No. 20151945.1, dated Mar. 2, 2020.

Notice of Reasons for Refusal dated Nov. 30, 2021, from the Japanese Patent Office in counterpart Japanese Application No. 2019-565326.

First Office Action dated Aug. 11, 2021, from the State Intellectual Property Office of People's Republic of China in counterpart Chinese Application No. 201910814859.9.

Notice of Allowance of Korean Application No. 10-2019-7035043, dated Jun. 7, 2022.

* cited by examiner

Charging a rechargeable battery of the mobile terminal with a constant power — 402

CONSTANT POWER CHARGING METHOD AND DEVICE FOR MOBILE TERMINAL

CROSS-REFERENCE TO RELATED APPLICATIONS

The present application is based upon and claims priority to Chinese Patent Application No. 201910814859.9, filed on Aug. 30, 2019, the entire content of which is incorporated herein by reference.

TECHNICAL FIELD

The present disclosure relates to the field of rechargeable battery, in particular to a charging method and device for a mobile terminal.

BACKGROUND

A mobile terminal such as a smartphone or tablet is usually provided with a rechargeable battery. When the rechargeable battery in the mobile terminal is out of power, it needs to be charged by a charger. A typical charging process includes a constant-current (CC) charging stage and a constant-voltage (CV) charging stage. The constant-current charging stage is a charging stage during which the charging current keeps constant and the charging voltage is increased gradually. The constant-voltage charging stage is a charging stage during which the charging voltage keeps constant and the charging current is reduced gradually.

The charging current in the CC charging stage is the largest during a charging process. If a temperature protection mechanism is disposed in the mobile terminal, once a surface temperature of the rechargeable battery (or mobile terminal) reaches a temperature threshold, the charging current is greatly reduced and thus charging time is prolonged.

SUMMARY

According to an aspect of the present disclosure, there is provided a charging method for a mobile terminal, including: charging a rechargeable battery of the mobile terminal with a constant power.

According to another aspect of the present disclosure, there is provided a charging device for a mobile terminal, including: a constant-power charging module, configured to charge a rechargeable battery of the mobile terminal with a constant power.

According to another aspect of the present disclosure, there is provided a mobile terminal, including a processor and a memory. The memory stores computer programs, and the processor is configured to execute the computer programs to implement the charging method for the mobile terminal.

According to another aspect of the present disclosure, there is provided a chip including a programmable logic circuit and program instructions. The chip is configured to, when operating, implement the charging method for the mobile terminal.

According to another aspect of the present disclosure, there is provided a charging adapter including a charging circuit. The charging circuit is configured to implement the charging method for the mobile terminal.

According to another aspect of the present disclosure, there is provided a non-transitory computer-readable storage medium having computer programs stored thereon. When the computer programs are executed by a processor, the processor is caused to implement the charging method for the mobile terminal.

The technical solutions provided by the embodiments of the present disclosure may have the following beneficial effects.

By charging the rechargeable battery of the mobile terminal with a constant power, the temperature can be kept relatively stable and constant without triggering temperature protection, so as to complete the charging as quickly as possible without triggering the temperature protection mechanism.

It is to be understood that both the foregoing general description and the following detailed description are exemplary and explanatory only and should not be taken as limiting the present disclosure.

BRIEF DESCRIPTION OF THE DRAWINGS

The accompanying drawings, which are incorporated in the specification and constitute a part of the specification, show the embodiments in compliance with the present disclosure, and are used to explain the principle of the present disclosure together with the description.

DETAILED DESCRIPTION

Exemplary embodiments will be described in detail herein, examples of which are illustrated in the accompanying drawings. In the following description related to the accompanying drawings, the same numeral in different figures indicates the same or similar element unless otherwise indicated. The embodiments described in the following exemplary embodiments do not represent all embodiments consistent with the present disclosure. Instead, they are merely examples of devices and methods consistent with aspects of the present disclosure as detailed in the appended claims.

In embodiments of the present disclosure, a mobile terminal is provided with a rechargeable battery. When the rechargeable battery is out of power, the rechargeable battery is charged by connecting a charger (or charging adapter) to the mobile terminal. A charging process may include the following stages: a pre-charging stage (also called trickle charging), a constant current (CC) charging stage, a constant voltage (CV) charging stage, and a charging termination stage.

In the pre-charging stage, when the voltage of the rechargeable battery is relatively low, in order to avoid damage to the rechargeable battery by direct and quick charging, charging is firstly performed with a relatively low charging current to activate the rechargeable battery.

In the CC charging stage, the rechargeable battery is quickly charged with a large and constant charging current, and the charging voltage is continuously increased during the CC charging stage.

In the CV charging stage, when the battery is close to full charge, the battery will be continuously charged with a constant voltage that the battery reaches when being fully charged. In the process of CV charging, the charging current will be continuously reduced.

Figure 1:
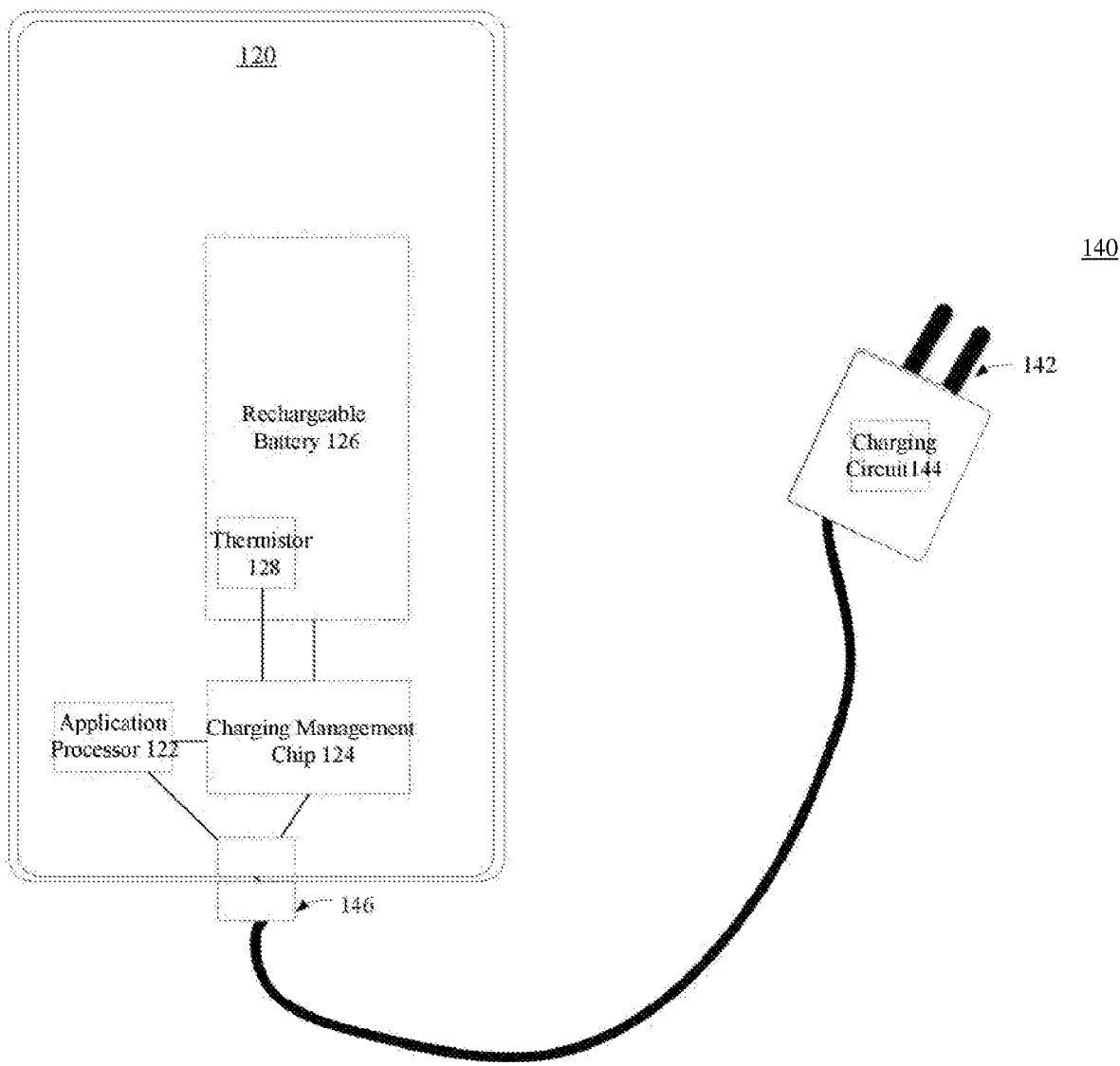
FIG. 1 is a schematic diagram of a charging system according to an exemplary embodiment.

FIG. 1 is a block diagram of a charging system according to an exemplary embodiment of the present disclosure. The charging system includes a mobile terminal 120 and a charger 140.

The mobile terminal 120 includes an application processor (AP) 122, a charge management chip (charge IC) 124, a rechargeable battery 126, and a thermistor 128. The application processor 122 is coupled to the charge management chip 124, the charge management chip 124 is coupled to the rechargeable battery 126, and the thermistor 128 is coupled to the charge management chip 124. The application processor 122 and the charging management chip 124 are also coupled to a charging interface on the mobile terminal 120. The thermistor 128 is disposed at at least one of a battery surface of the rechargeable battery 126, a body interior of the mobile terminal 120, a body surface of the mobile terminal 120, and a middle frame position of the mobile terminal 120, which is not limited in the present disclosure. In some embodiments, the thermistor 128 is not included.

The charger 140 includes a power plug end 142, a charging circuit 144, and a terminal plug end 146. The power plug end 142 is configured to connect to an electric supply (such as 220V or 110V) socket, the charging circuit 144 is configured to convert the electric supply into the charging current and the charging voltage, and the terminal plug end 146 is configured to connect to the mobile terminal 120. The terminal plug end 146 may be an USB interface or a lighting interface of various versions, such as an USB interface of Type-C.

Since the charging process may cause the rechargeable battery 126 to generate heat, in some embodiments, the charging management chip 124 in the mobile terminal 120 is provided with a temperature protection mechanism, which is used to protect the mobile terminal 120 from generating too much heat.

Figure 2:
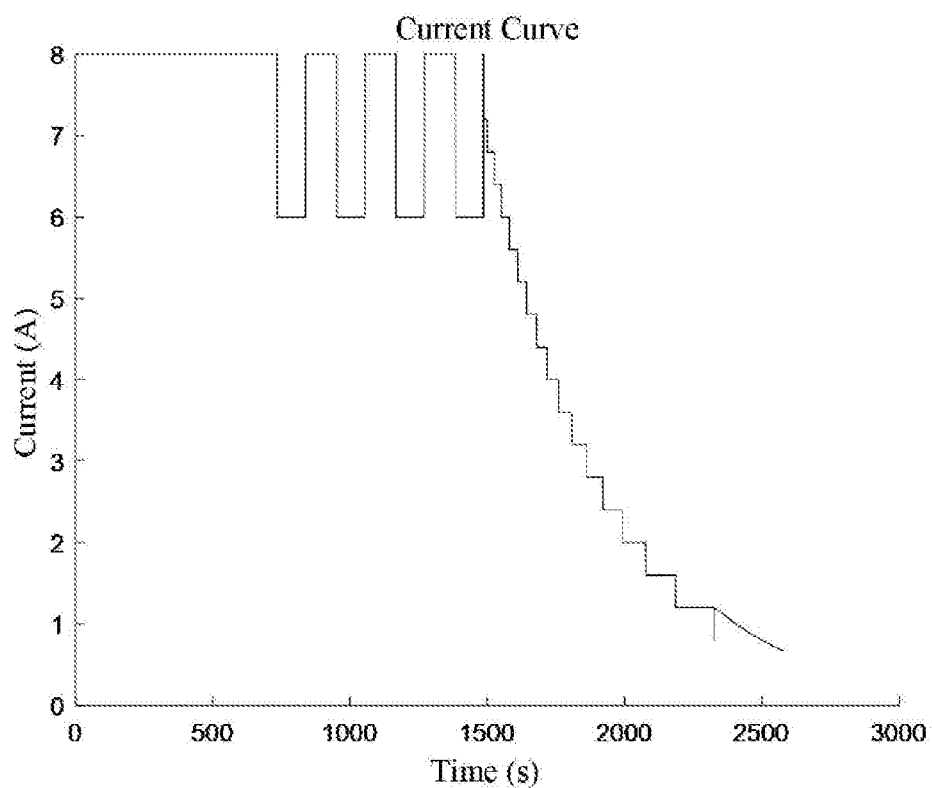
FIG. 2 is a charging current diagram of a charging method for a mobile terminal in related art.
Figure 3:
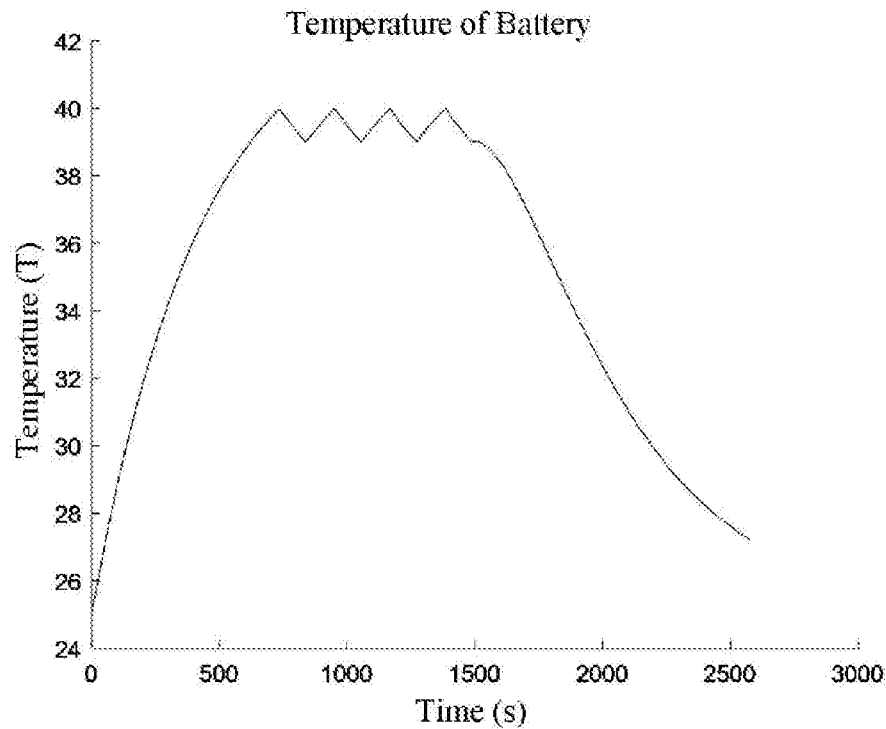
FIG. 3 is a temperature diagram of a charging method for a mobile terminal in related art.

FIG. 2 and FIG. 3 respectively show a charging current diagram and a battery temperature diagram after the temperature protection mechanism is triggered, according to related art. The thermistor 128 is configured to measure the surface temperature of the rechargeable battery 126 at a predetermined time interval. When the surface temperature reaches a temperature threshold (e.g., 40 degrees), the charging current is lowered by L (the value of L is relatively large, such as 2A), which is a current adjustment value for temperature protection. When the surface temperature drops to another temperature threshold (such as 38.5 degrees), the charging current is restored to the current value before the dropping. The above steps are repeated to prevent the temperature from being too high.

Since the charging current in the CC charging stage in the related art is relatively large, the temperature of the rechargeable battery rises rapidly. When the surface temperature of the rechargeable battery triggers the temperature protection mechanism, the application processor 122 triggers the charge management chip 124 to reduce the current value of the charging current by generating a pulse current. Since the pulse-triggering is a simple and rough manner for reducing the value of the charging current, the overall charging time is delayed.

At the same time, the maximum charging power in the CC charging stage determines the maximum output power of the charger, and the larger the maximum output power of the charger, the higher the cost.

Users may also use chargers of different brands and models. If the charging is performed in a rated power-lowering manner (for example, a mobile phone with a maximum charging power of 27 W uses a charger with a maximum output power of 18 W), when the CC charging mode is adopted, the output power in most of the time is lower than the maximum charging power of 18 W, therefore the charger power of the charger is wasted.

The present disclosure provides a new mode of charging stage: constant-power (CP) charging mode. The charging power is kept constant for a period of time during the entire charging process, the charging is smoothly performed without triggering the temperature protection mechanism (or the time point of generating the maximum heat), and at the same time, the requirement for the maximum output power of the charger is reduced.

Figures 4, 5:
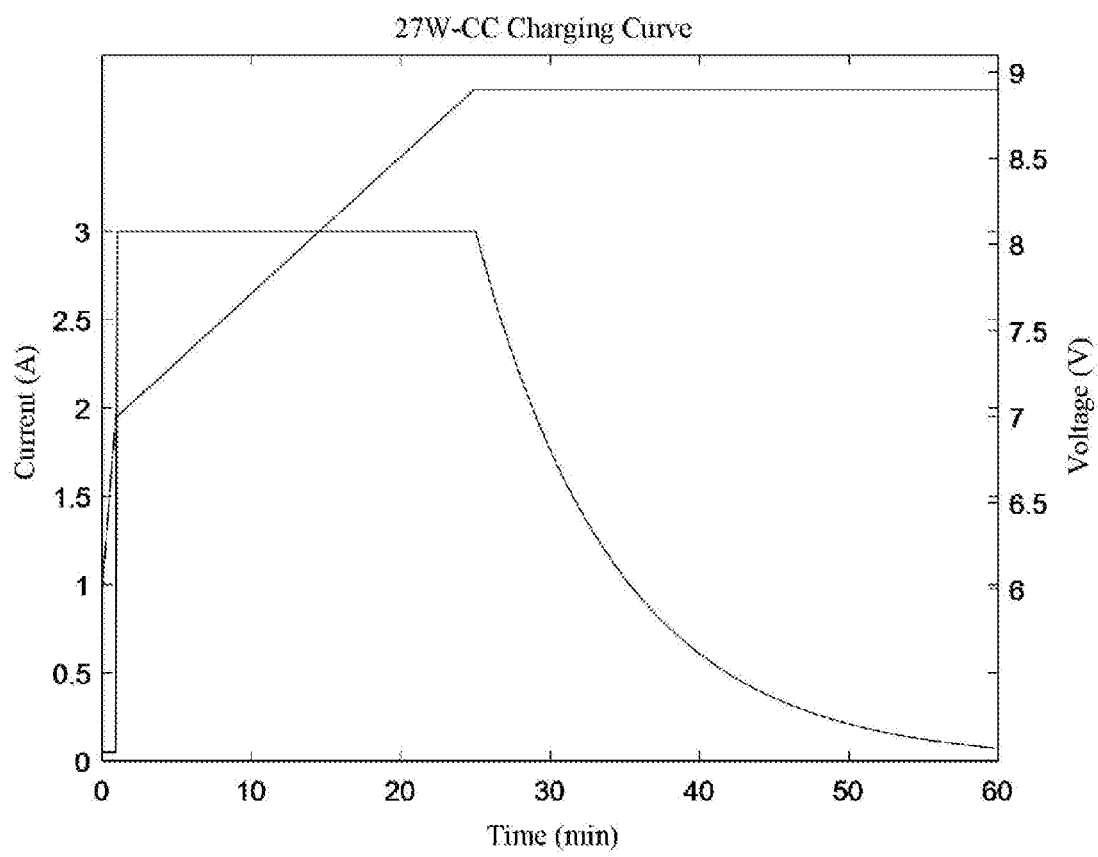
FIG. 4 is a flowchart of a charging method for a mobile terminal according to an exemplary embodiment.
FIG. 5 is a charging current diagram of a 27 W constant-current charging scheme in related art.

FIG. 4 is a flowchart showing a charging method for a mobile terminal according to an exemplary embodiment of the present disclosure. The method may be performed by the application processor 122, the charge management chip 124, or the charger 140. The method includes: charging a rechargeable battery of the mobile terminal with a constant power in step 402.

During a certain time period of the charging process, the charging management chip charges the rechargeable battery of the mobile terminal with a constant power.

In an embodiment, the charge management chip charges the rechargeable battery of the mobile terminal in such a manner that the charging voltage is increased gradually and the charging current is reduced gradually. The product of the charging voltage and the charging current, that is, the charging power, at the same time is a constant value or in a constant range.

The constant range is a relatively small power range that allows the charging power to fluctuate within this constant range. In one example, the fluctuation in the range of ±1 W is allowed based on the charging power of 27 W.

In the embodiment, by charging the rechargeable battery of the mobile terminal with a constant power, the temperature during the charging process can be kept relatively stable and constant without triggering the temperature protection, so as to complete the charging as quickly as possible without triggering the temperature protection mechanism.

Figure 6:
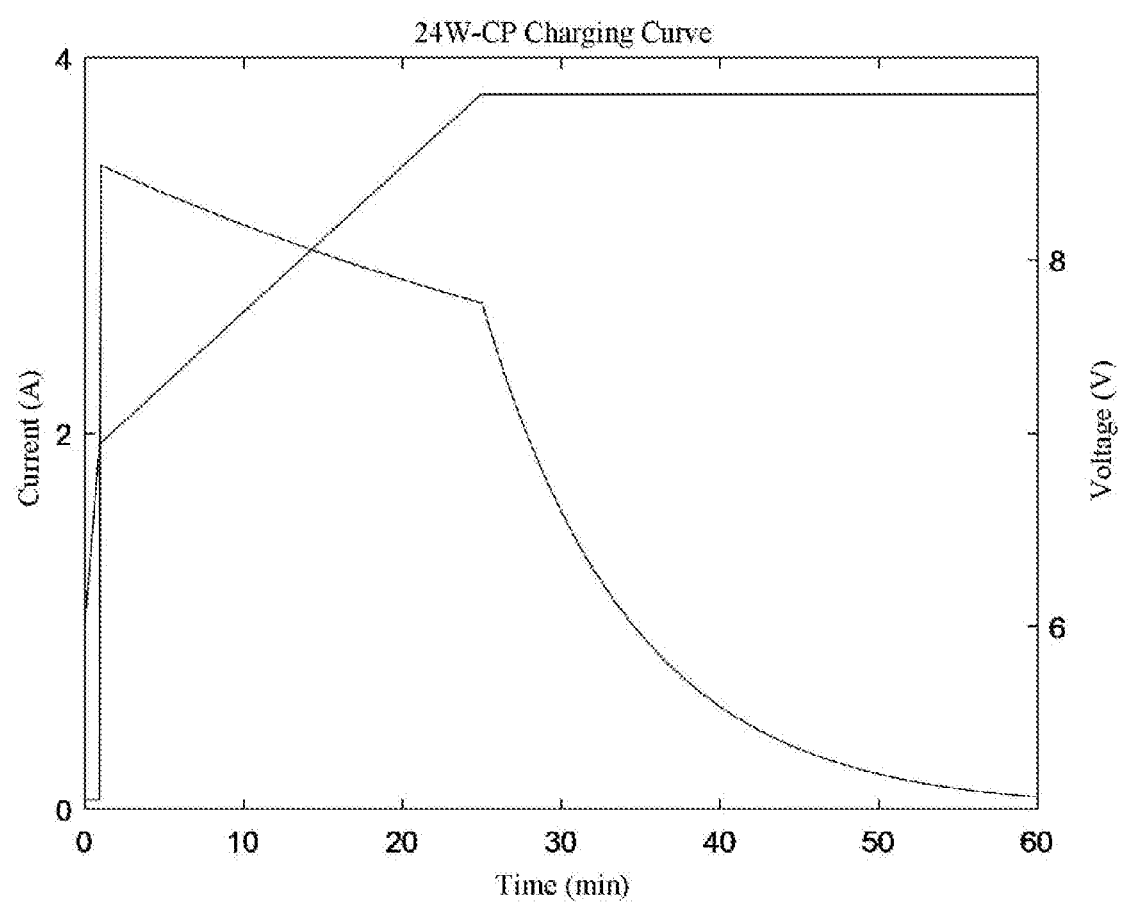
FIG. 6 is a charging current diagram of a 24 W constant-power charging scheme according to an embodiment.
Figure 7:
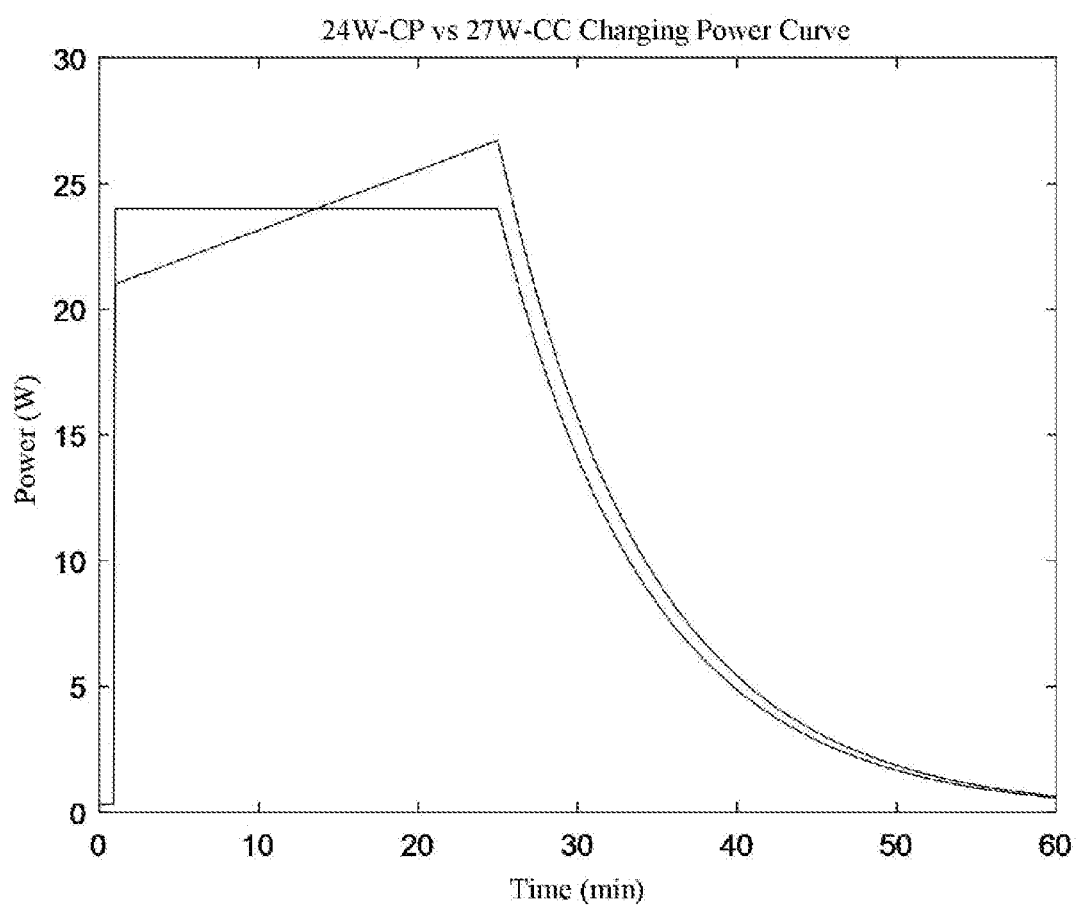
FIG. 7 is a comparison diagram of charging power of the 27 W constant-current charging scheme and the 24 W constant power charging scheme, according to an exemplary embodiment.

FIG. 5 shows a charging curve of a 27 W direct charging scheme in related art. The direct charging scheme adopts the CC charging mode, i.e., a 2:1 direct charging scheme in which the power supply voltage is twice as large as the battery voltage. FIG. 6 shows a charging curve of a 24 W constant-power charging scheme according to an exemplary embodiment. FIG. 7 shows a comparison of the charging power curves of the 27 W direct charging scheme and the 24 W constant-power charging scheme. It can be seen from FIG. 7 that the integrated areas (total power) of the charging power curves of the two charging schemes are substantially the same, and the charging termination times of the two charging schemes are substantially the same, that is, the charging speeds are the substantially same. However, the maximum power of the 24 W constant-power charging scheme is less than that of the 27 W direct charging scheme (CC charging mode) during the entire charging process. The CP charging mode provided by the embodiment of the present disclosure has at least the following beneficial effects.

(1) It has few requirements for structural thermal design of the mobile terminal; a temperature rising rate is lower than that in the CC charging mode; and the temperature protection mechanism may even not be triggered to avoid the phenomenon of lowering the charging current and limiting the CPU frequency.

(2) It has few requirements for the maximum power output of the charger, which may reduce the cost of the charger.

(3) The same charging speed may be reached by adopting the charger with smaller output power.

The charging power of the mobile terminal is determined by factors such as the allowable current of a battery cell itself, the allowable current of a battery protection board, the current value of the charging management chip, and the temperature rise limit. After a certain type of mobile terminal is designed, its charging power has an upper limit and is generally known.

Since the user may use different types of chargers, if the mobile terminal supporting the maximum charging power of 27 W uses a charger with a maximum output power of 18 W, the mobile terminal supporting the maximum charging power of 27 W will be treated as the mobile terminal supporting the maximum charging power of 18 W in the related art. That is, the maximum power during the entire charging process is 18 W (the charging power is less than 18 W in most of the time). When the CP charging mode provided by the embodiments of the present disclosure is adopted, the entire CC charging process may be replaced with the CP charging mode with a maximum charging power of 18 W, which greatly speeds up the charging.

For the usage scenario in which the user uses the rated power-lowering charger (the maximum output power of the charger is less than the maximum charging power supported by the mobile terminal), the present disclosure provides the following embodiments.

In a first embodiment, when the mobile terminal and the charger perform a handshake protocol (an initialization stage after the mobile terminal being connected to the charger), the charging mode is determined according to the power negotiation result.

(1) The traditional CC charging mode is adopted, if the maximum output power of the charger is greater than or equal to the maximum charging power supported by the mobile terminal. At this time, the mobile terminal is the bottleneck (battery cell or temperature rise), and the maximum current allowed by the rechargeable battery is fixed.

(2) The CP (constant power) mode is adopted, if the maximum output power of the charger is less than the maximum charging power supported by the mobile terminal. At this time, the charger is the bottleneck, and the charging current is greater than the maximum current corresponding to the maximum power of the charger.

In a second embodiment, when the mobile terminal and the charger perform a handshake protocol (an initialization stage after the mobile terminal being connected to the charger), the mobile terminal nominalizes its own average power to the charger, and determines the charging mode according to the power negotiation result.

(1) The traditional CC charging mode is adopted, if the maximum output power of the charger is greater than or equal to the average charging power supported by the mobile terminal. At this time, the mobile terminal is the bottleneck (battery cell or temperature rise), and the maximum current allowed by the rechargeable battery is fixed.

(2) The rated power-lowering CP (constant power) mode or the rated power-lowering CC (constant current) mode is adopted, if the maximum output power of the charger is less than or equal to the average charging power supported by the mobile terminal.

The first embodiment will be described further using FIG. 8.

Figure 8:
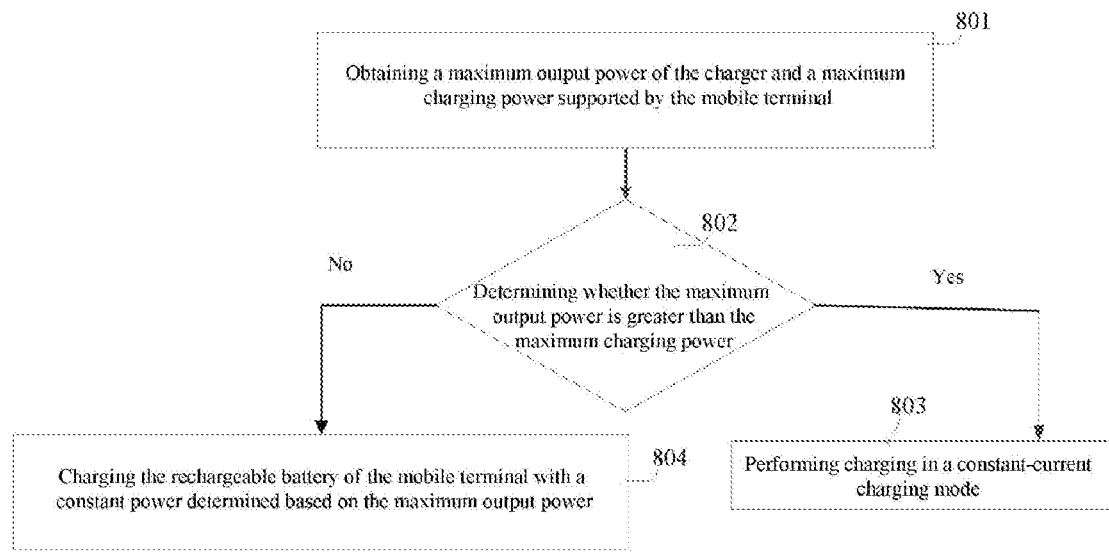
FIG. 8 is a flowchart of a charging method for a mobile terminal according to an exemplary embodiment.

FIG. 8 is a flow chart showing a charging method for a mobile terminal according to an exemplary embodiment of the present disclosure. The method may be performed by the application processor or the charger. The method includes the following steps.

In step 801, a maximum output power of the charger and a maximum charging power supported by the mobile terminal are obtained.

When the mobile terminal and the charger are electrically connected, a handshake protocol is performed between the application processor in the mobile terminal and the charging circuit of the charger. Both the application processor and the charging circuit may obtain the maximum output power of the charger and the maximum charging power supported by the mobile terminal.

In step 802, it is determined whether the maximum output power is greater than the maximum charging power.

When the maximum output power is greater than or equal to the maximum charging power, step 803 is performed; and when the maximum output power is less than the maximum charging power, step 804 is performed;

In the step 803, charging is performed by adopting the constant-current charging mode.

In the step 804, the charging of the rechargeable battery of the mobile terminal is performed by adopting the constant power determined based on the maximum output power.

In an embodiment, the constant power is equal to the maximum output power of the charger, or the constant power is slightly less than the maximum output power of the charger.

When the method is performed by the charger, the application processor sends a control command to the charger for instructing the charger to enter the CP mode. After receiving the control command, the charger enters into the CP mode, determines a constant power according to its maximum output power, and charges the rechargeable battery of the mobile terminal during a target time period of the charging process.

When the method is performed by the application processor, the application processor and the charger communicate with each other continuously (periodically or through triggering), and the application processor generates the control instruction according to the charging current and the charging voltage of the charger. The control instruction is used for adjusting at least one of the charging current and the charging voltage of the charger, so as to control the charging power of the charger to be a constant power (or in a constant power range).

In an embodiment, the target time period is a time period for replacing the CC charging stage, or a time period before the CC charging stage, or a time period after the CC charging stage.

In the embodiment, by charging the rechargeable battery of the mobile terminal with the constant power, the temperature can be kept relatively stable and constant without triggering the temperature protection, so as to complete the charging as quickly as possible without triggering the temperature protection mechanism.

Besides, according to the method provided by the embodiment, when the maximum output power of the charger is less than the maximum charging power supported by the mobile terminal, by charging the rechargeable battery of the mobile terminal with the constant power determined based on the maximum output power, it can make full use of the maximum output power of the charger for charging, so as to improve the charging efficiency and the charging speed.

The second embodiment will be described below using FIG. 9.

Figure 9:
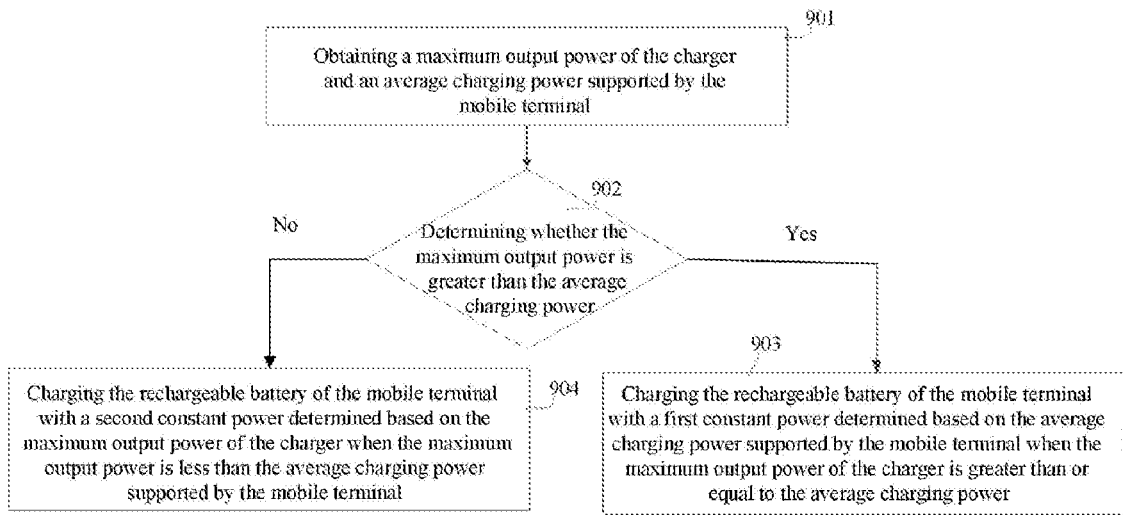
FIG. 9 is a flowchart of a charging method for a mobile terminal according to an exemplary embodiment.

FIG. 9 is a flow chart showing a charging method for a mobile terminal provided by an exemplary embodiment of the present disclosure. The method may be performed by the application processor or the charger. The method includes the following steps.

In step 901, a maximum output power of the charger and an average charging power supported by the mobile terminal are obtained.

When the mobile terminal and the charger are electrically connected, a handshake protocol is performed between the application processor in the mobile terminal and the charging circuit of the charger. Both the application processor and the charging circuit may obtain the maximum output power of the charger and the average charging power supported by the mobile terminal.

In step 902, it is determined whether the maximum output power is greater than the average charging power.

When the maximum output power is greater than or equal to the average charging power, step 903 is performed; and when the maximum output power is less than the average charging power, step 904 is performed.

In the step 903, when the maximum output power of the charger is greater than or equal to the average charging power supported by the mobile terminal, the rechargeable battery of the mobile terminal is charged with a first constant power determined based on the average charging power.

In an embodiment, the constant power is equal to the average charging power supported by the terminal device, or the constant power is slightly less than the average charging power supported by the terminal device.

In the step 904, when the maximum output power of the charger is less than the average charging power supported by the mobile terminal, the rechargeable battery of the mobile terminal is charged with a second constant power determined based on the maximum output power.

In an embodiment, the constant power is equal to the maximum output power of the charger, or the constant power is slightly less than the maximum output power of the charger.

When the method is performed by the charger, the application processor sends a control command to the charger for instructing the charger to enter into the CP mode. After receiving the control command, the charger enters into the CP mode, determines a constant power according to its maximum output power, and charges the rechargeable battery of the mobile terminal during a target time period of the charging process.

When the method is performed by the application processor, the application processor and the charger communicate with each other continuously (periodically or through triggering), and the application processor generates the control instruction according to the charging current and the charging voltage of the charger. The control instruction is used for adjusting at least one of the charging current and the charging voltage of the charger, so as to control the charging power of the charger to be a constant power.

In an embodiment, the target time period is a time period for replacing the CC charging stage, or a time period before the CC charging stage, or a time period after the CC charging stage.

In the embodiment, by charging the rechargeable battery of the mobile terminal with the constant power, the temperature can be kept relatively stable and constant without triggering the temperature protection, so as to complete the charging as quickly as possible without triggering the temperature protection mechanism.

Besides, according to the method provided by the embodiment, when the maximum output power of the charger is greater than the average charging power supported by the mobile terminal, by charging the rechargeable battery of the mobile terminal with the constant power determined based on the average output power, it can make full use of the maximum output power of the charger for charging, so as to improve the charging efficiency and the charging speed.

Besides, according to the method provided by the embodiment, when the maximum output power of the charger is less than the average charging power supported by the mobile terminal, by charging the rechargeable battery of the mobile terminal with the constant power determined based on the maximum output power, it can make full use of the maximum output power of the charger for charging, so as to improve the charging efficiency and the charging speed.

It should be noted that the relationship between the CP charging mode and the CC charging mode is not purely mutual replaceable. Instead, the mixed use of these two charging modes is allowed. For example, in the charging process, the charging mode may switch from the CC charging mode to the CP charging mode, or from the CP charging mode to the CC charging mode. The charging mode may be determined based on the charging strategy and temperature rise of a specific application.

In some embodiments, the charging process may include not only the CC charging mode or the CV charging mode, but also a step CC charging mode, a step CV charging mode, or any combination thereof.

Figure 10:
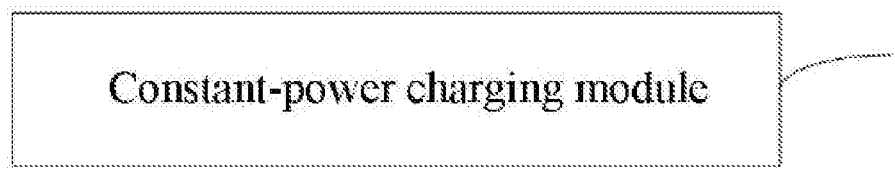
FIG. 10 is a block diagram of a charging device for a mobile terminal according to an exemplary embodiment.

FIG. 10 is a block diagram of a charging device for a mobile terminal according to an exemplary embodiment of the present disclosure. The charging device includes a constant-power charging module 1020.

The constant-power charging module 1020 is configured to charge a rechargeable battery of the mobile terminal with a constant power.

In an embodiment, the constant-power charging module 1020 is configured to charge the rechargeable battery of the mobile terminal in such a manner that the charging voltage is increased gradually and the charging current is reduced gradually. The product of the charging voltage and the charging current at the same time is a constant value or in a constant range.

In an embodiment, the constant-power charging module 1020 is configured to: when the maximum output power of the charger is less than the maximum charging power supported by the mobile terminal, charge the rechargeable battery of the mobile terminal with a constant power determined based on the maximum output power.

In an embodiment, the constant-power charging module 1020 is configured to: when the maximum output power of the charger is greater than or equal to the average charging power supported by the mobile terminal, charge the rechargeable battery of the mobile terminal with a first constant power determined based on the average charging power; and when the maximum output power of the charger is less than the average charging power supported by the mobile terminal, charge the rechargeable battery of the mobile terminal with a second constant power determined based on the maximum output power.

In an embodiment, the constant-power charging module 1020 is configured to charge the rechargeable battery of the mobile terminal with the constant power during a target time period of the charging process. The target time period is any one of a time period for replacing the constant-current charging stage, a time period before the constant-current charging stage, and a time period after the constant-current charging stage.

Figure 11:
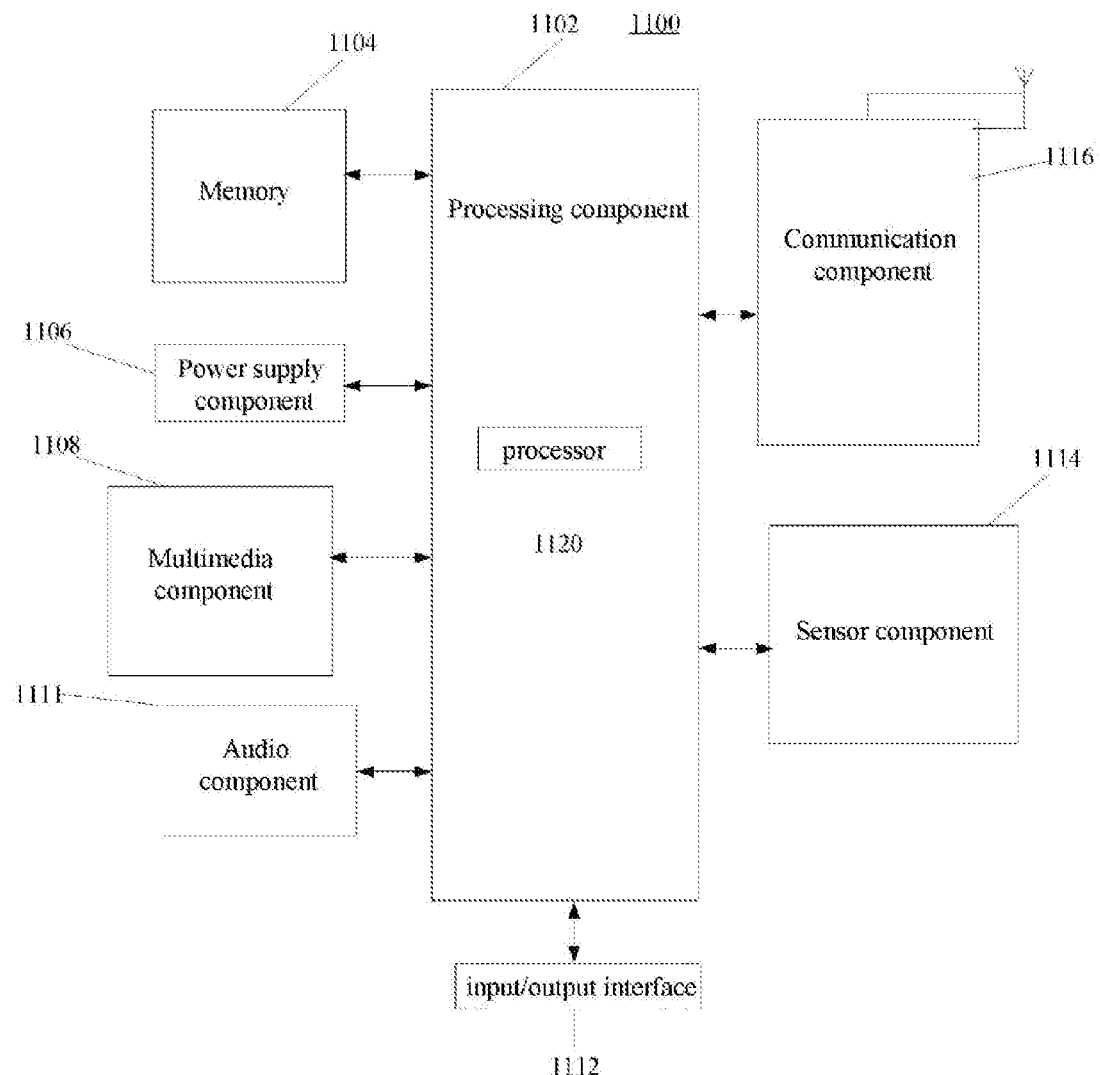
FIG. 11 is a block diagram of a mobile terminal according to an exemplary embodiment.

FIG. 11 is a block diagram of a device 1100 according to an exemplary embodiment. For example, the device 1100 can be a mobile phone, a digital broadcast terminal, a message transceiver, a game console, a tablet device, a medical device, a fitness device, a personal digital assistant, and the like.

Referring to FIG. 11, the device 1100 may include one or more of the following components: a processing component 1102, a memory 1104, a power supply component 1106, a multimedia component 1108, an audio component 1111, an input/output (I/O) interface 1112, a sensor component 1114, and a communication component 1116.

The processing component 1102 typically controls the overall operation of the device 1100, such as operations associated with display, telephone calls, data communications, camera operations, and recording operations. The processing component 1102 may include one or more processors 1120 to execute instructions to perform all or part of the steps of the above described methods. Moreover, the processing component 1102 may include one or more modules to facilitate interaction between the processing component 1102 and other components. For example, the processing component 1102 may include a multimedia module to facilitate interaction between the multimedia component 1108 and the processing component 1102.

The memory 1104 is configured to store various types of data to support operation at the device 1100. Examples of such data include instructions for any applications or methods operating on the device 1100, contact data, phone book data, messages, pictures, videos, and the like. The memory 1104 may be implemented by any type of volatile or non-volatile storage device or a combination thereof, such as Static Random Access Memory (SRAM), Electrically Erasable Programmable Read Only Memory (EEPROM), Erasable Programmable Read Only Memory (EPROM), Programmable Read Only Memory (PROM), Read Only Memory (ROM), Magnetic Memory, Flash Memory, Magnetic Disk or Optical Disk.

The power supply component 1106 provides power to various components of the device 1100. The power supply component 1106 may include a power management system, one or more power supplies, and other components associated with generating, managing, and distributing power for the device 1100.

The multimedia component 1108 includes a screen that provides an output interface between the device 1100 and the user. In some embodiments, the screen may include a Liquid Crystal Display (LCD) and a Touch Panel (TP). If the screen includes a touch panel, the screen can be implemented as a touch screen to receive input signals from the user. The touch panel includes one or more touch sensors to sense touches, slides, and gestures on the touch panel. The touch sensor can sense not only the boundaries of the touch or sliding action, but also the duration and pressure associated with the touch or slide operation. In some embodiments, the multimedia component 1108 includes a front camera and/or a rear camera. When the device 1100 is in an operation mode, such as a shooting mode or a video mode, the front camera and/or the rear camera can receive external multimedia data. Each of the front and rear cameras can be a fixed optical lens system or have focal length and optical zoom capabilities.

The audio component 1111 is configured to output and/or input an audio signal. For example, the audio component 1110 includes a microphone (MIC) that is configured to receive an external audio signal when the device 1100 is in an operational mode, such as a call mode, a recording mode, and a voice recognition mode. The received audio signal may be further stored in the memory 1104 or sent via the communication component 1116. In some embodiments, the audio component 1110 also includes a speaker for outputting an audio signal.

The I/O interface 1112 provides an interface between the processing component 1102 and peripheral interface module, which may be a keyboard, a click wheel, a button, or the like. These buttons may include, but are not limited to, a home button, a volume button, a start button, and a lock button.

The sensor assembly 1114 includes one or more sensors for providing status assessment of various aspects to device 1100. For example, the sensor component 1114 can detect an on/off state of the device 1100, a relative positioning of components, such as a display and a keypad of device 1100, and the sensor component 1114 can also detect a change in position of a component of the device 1100 or the device 1100, presence or absence of contact between user and the device 1100, orientation or acceleration/deceleration of the device 1100 and temperature change of the device 1100. The sensor assembly 1114 can include a proximity sensor configured to detect the presence of nearby objects without any physical contact. The sensor component 1114 can also include a light sensor, such as a CMOS or CCD image sensor, for use in imaging applications. In some embodiments, the sensor assembly 1114 may also include an acceleration sensor, a gyro sensor, a magnetic sensor, a pressure sensor, or a temperature sensor.

The communication component 1116 is configured to facilitate wired or wireless communication between the device 1100 and other devices. The device 1100 can access a wireless network based on a communication standard, such as WiFi, 4G or 5G, or a combination thereof. In an exemplary embodiment, the communication component 1116 receives broadcast signals or broadcast associated information from an external broadcast management system via a broadcast channel. In an exemplary embodiment, the communication component 1116 further includes a near field communication (NFC) module to facilitate short range communication.

In an exemplary embodiment, the device 1100 may be implemented by one or more application specific integrated circuits (ASICs), digital signal processors (DSPs), digital signal processing devices (DSPDs), programmable logic devices (PLDs), field programmable gate array (FPGA), controllers, microcontrollers, microprocessors, or other electronic components for performing the above methods.

In an exemplary embodiment, there is also provided a non-transitory computer readable storage medium including instructions, such as the memory 1104 including instructions, and the instructions may be executed by the processor 1120 of the device 1100 to implement the above method. For example, the non-transitory computer readable storage medium may be a ROM, a random access memory (RAM), a CD-ROM, a magnetic tape, a floppy disk, and an optical data storage device.

When the instructions stored on the storage medium are executed by a processor of a terminal, the terminal is caused to perform the charging methods described above.

Embodiments of the present disclosure also provide a chip including a programmable logic circuit and/or program instructions. The chip is configured to, when operating, implement the charging method described above.

Embodiments of the present disclosure also provide a charging adapter including a charging circuit. The charging circuit is configured to implement the charging method described above.

Other embodiments of the present disclosure will be apparent to those skilled in the art in consideration of the specification and upon the practice of the present disclosure disclosed here. The present disclosure is intended to cover any variations, uses, or adaptations of the present disclosure, which are in accordance with the general principles of the disclosure and include the common knowledge or general technical means in the art that are not disclosed in the present disclosure. The specification and embodiments are deemed to be exemplary only and the true scope and spirit of this disclosure is indicated by the claims below.

It should be understood that this disclosure is not limited to the exact structure described above and shown in the accompanying drawings, and can be subject to various modifications and changes without deviating from its scope. The scope of the disclosure is to be limited only by the appended claims.

What is claimed is:

1. A charging method for a mobile terminal, comprising:
charging a rechargeable battery of the mobile terminal with a constant power,
wherein the charging a rechargeable battery of the mobile terminal with a constant power comprises:
charging the rechargeable battery of the mobile terminal with a first constant power determined based on an average charging power supported by the mobile terminal, when a maximum output power of a charger is greater than or equal to the average charging power supported by the mobile terminal, wherein the first constant power is equal to or smaller than the average charging power supported by the mobile terminal; and
charging the rechargeable battery of the mobile terminal with a second constant power determined based on the maximum output power of the charger, when the maximum output power of the charger is less than the average charging power supported by the mobile terminal.

2. The charging method according to claim 1, wherein the charging a rechargeable battery of the mobile terminal with a constant power comprises:
charging the rechargeable battery of the mobile terminal in such a manner that a charging voltage is increased gradually and a charging current is reduced gradually, wherein a product of the charging voltage and the charging current at a same time is a constant value or in a constant range.

3. The charging method according to claim 1, wherein the charging a rechargeable battery of the mobile terminal with a constant power comprises:
charging the rechargeable battery of the mobile terminal with the constant power during a target time period of a charging process,
wherein the target time period is any one of a time period for replacing a constant-current charging stage, a time period before the constant-current charging stage, and a time period after the constant-current charging stage.

4. A charging adapter, comprising a charging circuit, wherein the charging circuit is configured to implement the charging method for the mobile terminal according to claim 1.

5. A non-transitory computer-readable storage medium having computer programs stored thereon, wherein when the computer programs are executed by a processor, the processor is caused to implement the charging method for the mobile terminal according to claim 1.

6. A mobile terminal, comprising:
a processor and a memory,
wherein the memory stores computer programs, and the processor is configured to execute the computer programs to cause charging a rechargeable battery of the mobile terminal with a constant power,
wherein the charging a rechargeable battery of the mobile terminal with a constant power comprises:
charging the rechargeable battery of the mobile terminal with a first constant power determined based on an average charging power supported by the mobile terminal, when a maximum output power of a charger is greater than or equal to the average charging power supported by the mobile terminal, wherein the first constant power is equal to or smaller than the average charging power supported by the mobile terminal; and
charging the rechargeable battery of the mobile terminal with a second constant power determined based on the maximum output power of the charger, when the maximum output power of the charger is less than the average charging power supported by the mobile terminal.

7. The mobile terminal according to claim 6, wherein the charging a rechargeable battery of the mobile terminal with a constant power comprises:
charging the rechargeable battery of the mobile terminal in such a manner that a charging voltage is increased gradually and a charging current is reduced gradually, wherein a product of the charging voltage and the charging current at a same time is a constant value or in a constant range.

8. The mobile terminal according to claim 6, wherein the charging a rechargeable battery of the mobile terminal with a constant power comprises:
charging the rechargeable battery of the mobile terminal with the constant power during a target time period of a charging process,
wherein the target time period is any one of a time period for replacing a constant-current charging stage, a time period before the constant-current charging stage, and a time period after the constant-current charging stage.

9. A chip, comprising:
a programmable logic circuit and program instructions, wherein the chip is configured to, when operating, cause charging a rechargeable battery of a mobile terminal with a constant power,
wherein the charging a rechargeable battery of the mobile terminal with a constant power comprises:
charging the rechargeable battery of the mobile terminal with a first constant power determined based on an average charging power supported by the mobile terminal, when a maximum output power of a charger is greater than or equal to the average charging power supported by the mobile terminal, wherein the first constant power is equal to or smaller than the average charging power supported by the mobile terminal; and charging the rechargeable battery of the mobile terminal with a second constant power determined based on the maximum output power of the charger, when the maximum output power of the charger is less than the average charging power supported by the mobile terminal.

10. The chip according to claim 9, wherein the charging a rechargeable battery of a mobile terminal with a constant power comprises:

charging the rechargeable battery of the mobile terminal in such a manner that a charging voltage is increased gradually and a charging current is reduced gradually, wherein a product of the charging voltage and the charging current at a same time is a constant value or in a constant range.

11. The chip according to claim 9, wherein the charging a rechargeable battery of a mobile terminal with a constant power comprises:

charging the rechargeable battery of the mobile terminal with the constant power during a target time period of a charging process, wherein the target time period is any one of a time period for replacing a constant-current charging stage, a time period before the constant-current charging stage, and a time period after the constant-current charging stage.

* * * * *